United States Patent
Sakaguchi et al.

(10) Patent No.: US 11,898,855 B2
(45) Date of Patent: Feb. 13, 2024

(54) ASSISTANCE CONTROL SYSTEM THAT PRIORITIZES ROUTE CANDIDATES BASED ON UNSUITABLE SECTIONS THEREOF

(71) Applicant: TOYOTA JIDOSHA KABUSHIKI KAISHA, Toyota (JP)

(72) Inventors: Eiji Sakaguchi, Shizuoka-ken (JP); Yasuhiro Takagi, Susono (JP); Nobuhide Kamata, Susono (JP); Taichi Kawanai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 17/462,688

(22) Filed: Aug. 31, 2021

(65) Prior Publication Data
US 2021/0396531 A1   Dec. 23, 2021

Related U.S. Application Data

(63) Continuation of application No. 16/516,824, filed on Jul. 19, 2019, now Pat. No. 11,255,681.

(30) Foreign Application Priority Data

Oct. 12, 2018   (JP) ................................ 2018-193670

(51) Int. Cl.
*G01C 21/34* (2006.01)
*G05D 1/02* (2020.01)
(Continued)

(52) U.S. Cl.
CPC ....... *G01C 21/3415* (2013.01); *G01C 21/367* (2013.01); *G01C 21/3848* (2020.08);
(Continued)

(58) Field of Classification Search
CPC ............ G01C 21/3415; G01C 21/3896; G01C 21/3848; G01C 21/367; G05D 1/0088;
(Continued)

(56) References Cited

U.S. PATENT DOCUMENTS 10,816,356 B2 * 10/2020 Shum ................. G01C 21/3691
2010/0036599 A1 * 2/2010 Froeberg ............ G01C 21/3461
701/532

(Continued)

FOREIGN PATENT DOCUMENTS

| CN | 106500708 A | 3/2017 |
|---|---|---|
| JP | 2006-146645 A | 6/2006 |

(Continued)

OTHER PUBLICATIONS

U.S. Appl. No. 16/517,811, filed Jul. 22, 2019.
(Continued)

*Primary Examiner* — Ramsey Refai
(74) *Attorney, Agent, or Firm* — Sughrue Mion, PLLC

(57) ABSTRACT

An assistance control system performs assistance control for causing a moving object to move to a destination based on map information. The assistance control system includes an electronic control unit. The electronic control unit is configured to generate or update the map information based on input from a sensor mounted on the moving object, acquire a plurality of route candidates to the destination, evaluate certainty of the map information for each location or each section, and calculate a map information evaluation value, evaluate accuracy of the assistance control in the acquired route candidates based on the calculated map information evaluation value, and present a route candidate having the highest priority among the route candidates to an occupant of the moving object, or control the moving object along the route candidate having the highest priority.

4 Claims, 11 Drawing Sheets

(51) Int. Cl.
*G08G 1/01* (2006.01)
*G05D 1/00* (2006.01)
*G08G 1/0968* (2006.01)
*G08G 1/0969* (2006.01)
*G01C 21/36* (2006.01)
*G01C 21/00* (2006.01)

(52) U.S. Cl.
CPC ....... *G01C 21/3896* (2020.08); *G05D 1/0088* (2013.01); *G05D 1/0276* (2013.01); *G08G 1/0145* (2013.01); *G08G 1/0969* (2013.01); *G08G 1/096833* (2013.01)

(58) Field of Classification Search
CPC ............... G05D 1/0276; G08G 1/0145; G08G 1/096833; G08G 1/0969
See application file for complete search history.

(56) References Cited

U.S. PATENT DOCUMENTS

| | | | |
|---|---|---|---|
| 2010/0241354 A1 | 9/2010 | Stählin et al. | |
| 2017/0067750 A1* | 3/2017 | Day | G08G 1/096716 |
| 2017/0236210 A1* | 8/2017 | Kumar | B60W 60/0053 705/4 |
| 2017/0307368 A1 | 10/2017 | Sasaki et al. | |
| 2017/0328725 A1* | 11/2017 | Schlesinger | G01C 21/3492 |
| 2018/0023966 A1 | 1/2018 | Iwai et al. | |
| 2018/0066960 A1 | 3/2018 | Tateishi | |
| 2018/0108254 A1* | 4/2018 | Camacho | G08G 1/096716 |
| 2019/0126930 A1 | 5/2019 | Kim | |
| 2020/0116509 A1 | 4/2020 | Sakaguchi | |

FOREIGN PATENT DOCUMENTS

| | | |
|---|---|---|
| JP | 2011-503563 A | 1/2011 |
| JP | 2012-198762 A | 10/2012 |
| JP | 2014-139538 A | 7/2014 |
| JP | 2017-138237 A | 8/2017 |
| WO | 2016/139748 A1 | 9/2016 |

OTHER PUBLICATIONS

Sakaguchi, Eiji et al., U.S. Appl. No. 16/516,824, filed Jul. 19, 2019.
Notice of Allowance dated Oct. 22, 2021 in U.S. Appl. No. 16/516,824.

* cited by examiner

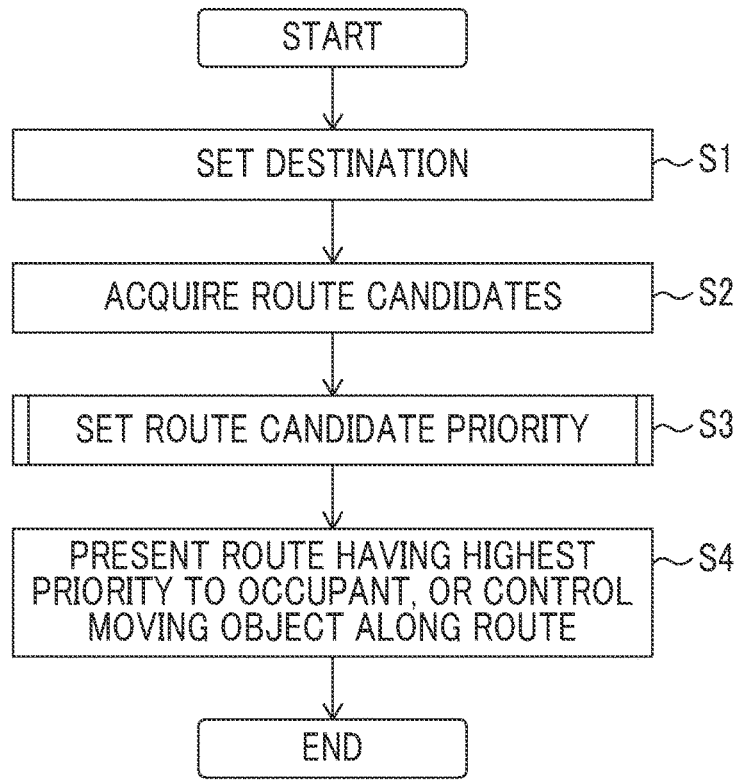
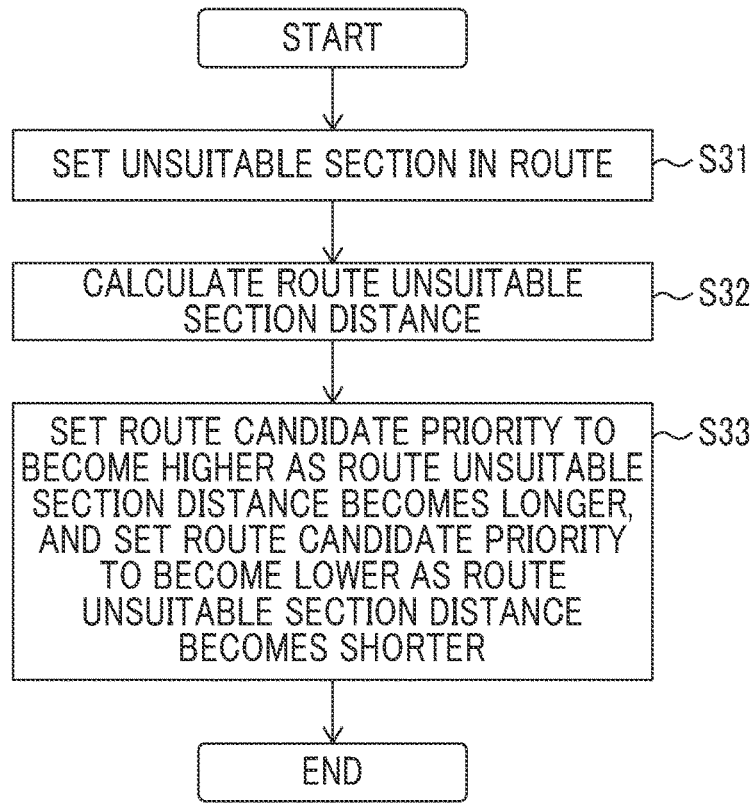

FIG. 12

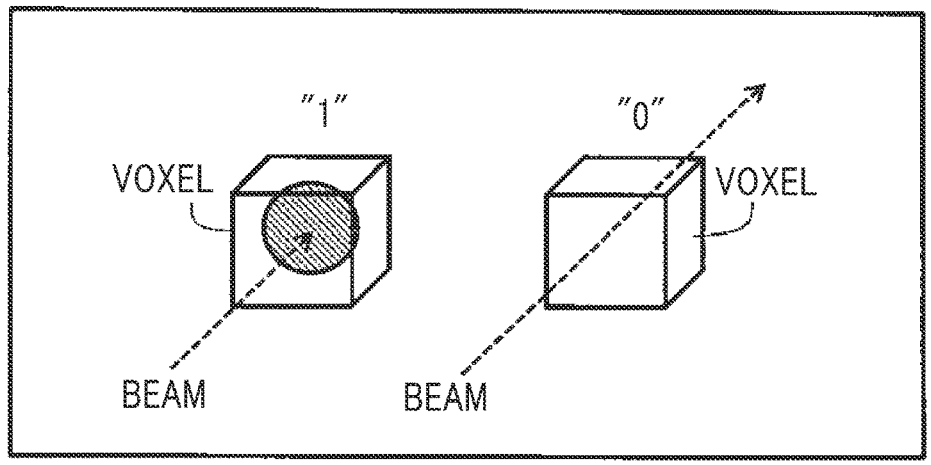

<STATIONARY OBJECT MAP INFORMATION>

| POSITION [X, Y, Z] | OCCUPANCY $R_i$ | STATIONARY OBJECT MAP EVALUATION INFORMATION (NUMBER OF TIMES OF MEASUREMENT, VARIANCE, AND THE LIKE) | STATIONARY OBJECT MAP INFORMATION EVALUATION VALUE |
|---|---|---|---|

FIG. 13

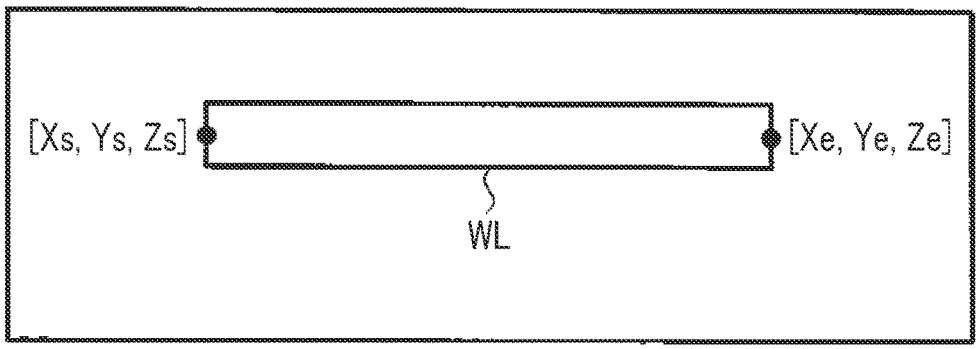

<CHARACTERISTIC OBJECT MAP INFORMATION>

| POSITION [Xs, Ys, Zs] [Xe, Ye, Ze] | CHARACTERISTIC OBJECT MAP EVALUATION INFORMATION (NUMBER OF TIMES OF MEASUREMENT, VARIANCE, AND THE LIKE) | CHARACTERISTIC OBJECT MAP INFORMATION EVALUATION VALUE |
|---|---|---|

FIG. 14

<TERRAIN MAP INFORMATION>

| POSITION [X, Y] | HEIGHT Z | TERRAIN MAP EVALUATION INFORMATION (NUMBER OF TIMES OF MEASUREMENT, VARIANCE, AND THE LIKE) | TERRAIN MAP INFORMATION EVALUATION VALUE |
|---|---|---|---|

ASSISTANCE CONTROL SYSTEM THAT PRIORITIZES ROUTE CANDIDATES BASED ON UNSUITABLE SECTIONS THEREOF

INCORPORATION BY REFERENCE

This application is a continuation of U.S. application Ser. No. 16/516,824 filed Jul. 19, 2019, which claims priority to Japanese Patent Application No. 2018-193670 filed on Oct. 12, 2018. The entire disclosures of the prior applications are considered part of the disclosure of the accompanying continuation application, and are hereby incorporated by reference.

BACKGROUND

1. Technical Field

The present disclosure relates to an assistance control system.

2. Description of Related Art

In the related art, as disclosed in WO 2016/0139748, there is a technique in which, in a vehicle that can perform autonomous driving, a location where autonomous driving is difficult from a current location to a destination is calculated based on surrounding environment information (hereinafter, referred to as "map information" in the present specification), and an avoidance route for avoiding the location where autonomous driving is difficult is calculated.

SUMMARY

Here, calculation of a location where autonomous driving is difficult or calculation of an avoidance route depends on the accuracy of acquired map information. In a case where the map information is not sufficient, there is a probability that the calculation may not be accurately performed, and thus it is desirable to increase the accuracy of the map information.

The present disclosure provides an assistance control system capable of contributing to increasing the accuracy of map information.

An aspect of the present disclosure relates to an assistance control system. The assistance control system includes a map database storing map information, and performs assistance control for causing a moving object to move to a destination based on the map information. The assistance control system includes an electronic control unit. The electronic control unit is configured to generate or update the map information based on input from a sensor mounted on the moving object, acquire a plurality of route candidates to the destination, evaluate certainty of the map information for each location or each section, and calculate a map information evaluation value, evaluate accuracy of the assistance control in the acquired route candidates based on the calculated map information evaluation value, set a priority of a route candidate evaluated lower among the route candidates, to be higher than priorities of other route candidates, and present a route candidate having the highest priority among the route candidates to an occupant of the moving object, or control the moving object along the route candidate having the highest priority.

According to the aspect, among a plurality of route candidates acquired in advance, a priority of a route candidate evaluated lower is set to be higher than priorities of other route candidates based on the map information evaluation value. A route having the highest priority is presented to an occupant of the moving object, or the moving object is controlled along the route. In other words, based on the map information evaluation value, a route candidate evaluated higher than other route candidates, that is, a route candidate in which the accuracy of the map information is high is not selected on purpose, and a route candidate evaluated lower than other route candidates, that is, a route candidate in which the accuracy of the map information is lower than those of other route candidates is selected. Therefore, a route candidate in which acquisition of map information is desirable by performing a larger number of movements than in other route candidates is more preferentially presented to an occupant than other route candidates, or the moving object is controlled along the route, and thus this can contribute to increasing the accuracy of map information.

In the assistance control system according to the aspect, the electronic control unit may be configured to calculate a distance of a section in which the calculated map information evaluation value is smaller than a predetermined threshold value in each of the route candidates, and increase a priority of a route candidate having the longer distance compared with a priority of a route candidate having the shorter distance among the route candidates.

According to the aspect, a route having a longer distance for which map information is not sufficiently acquired is preferentially presented to an occupant or the moving object is controlled along the route, and this can further contribute to increasing the accuracy of map information.

In the assistance control system according to the aspect, the electronic control unit may be configured to update the map information evaluation value due to movement of the moving object along the route candidate having the highest priority, and reduce the priority of the route candidate having the highest priority based on a change amount of the map information evaluation value within a predetermined time.

According to the aspect, it is determined whether selection of a route is appropriate based on a change amount of a map information evaluation value due to update of map information, and it is possible to determine whether another route is presented to an occupant or the moving object is controlled along the route by reducing a priority when the selection is not appropriate. Therefore, it is possible to further contribute to increasing the accuracy of map information.

In the assistance control system according to the aspect, when the number of times of the moving object having moved along the route candidate having the highest priority is equal to or larger than a predetermined number of times, the electronic control unit may be configured to determine whether the change amount between the map information evaluation value before the moving object moves and the map information evaluation value after the moving object moves is equal to or smaller than a first predetermined amount, and reduce the priority of the route candidate having the highest priority when the electronic control unit determines that the change amount is equal to or smaller than the first predetermined amount.

According to the aspect, when a map information evaluation value is not improved by a predetermined amount within a predetermined time despite map information being updated, the route can be changed to another route in which a map information evaluation value is more easily improved, and the changed route can be presented to an occupant or the moving object can be controlled along the changed route.

Therefore, it is possible to further contribute to increasing the accuracy of map information.

In the assistance control system according to the aspect, the electronic control unit may be configured to determine whether the change amount is equal to or larger than a second predetermined amount larger than the first predetermined amount, and reduce the priority of the route candidate having the highest priority when the electronic control unit determines that the change amount is equal to or larger than the second predetermined amount.

According to the aspect of the present disclosure, it is possible to provide the assistance control system capable of contributing to increasing the accuracy of map information.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4A is a graph illustrating an example of a map information evaluation value calculated for each route candidate, and illustrates an evaluation value of a route candidate a;

FIG. 7 is a flowchart illustrating a process performed by the assistance control system illustrated in FIG. 1;

FIG. 8 is a flowchart illustrating a process performed by the assistance control system illustrated in FIG. 1;

FIG. 12 is a schematic diagram illustrating stationary object map information that is an example of map information;

FIG. 13 is a schematic diagram illustrating characteristic object map information that is an example of the map information; and FIG. 14 is a schematic diagram illustrating terrain map information that is an example of the map information.

DETAILED DESCRIPTION OF EMBODIMENTS

Figure 1:
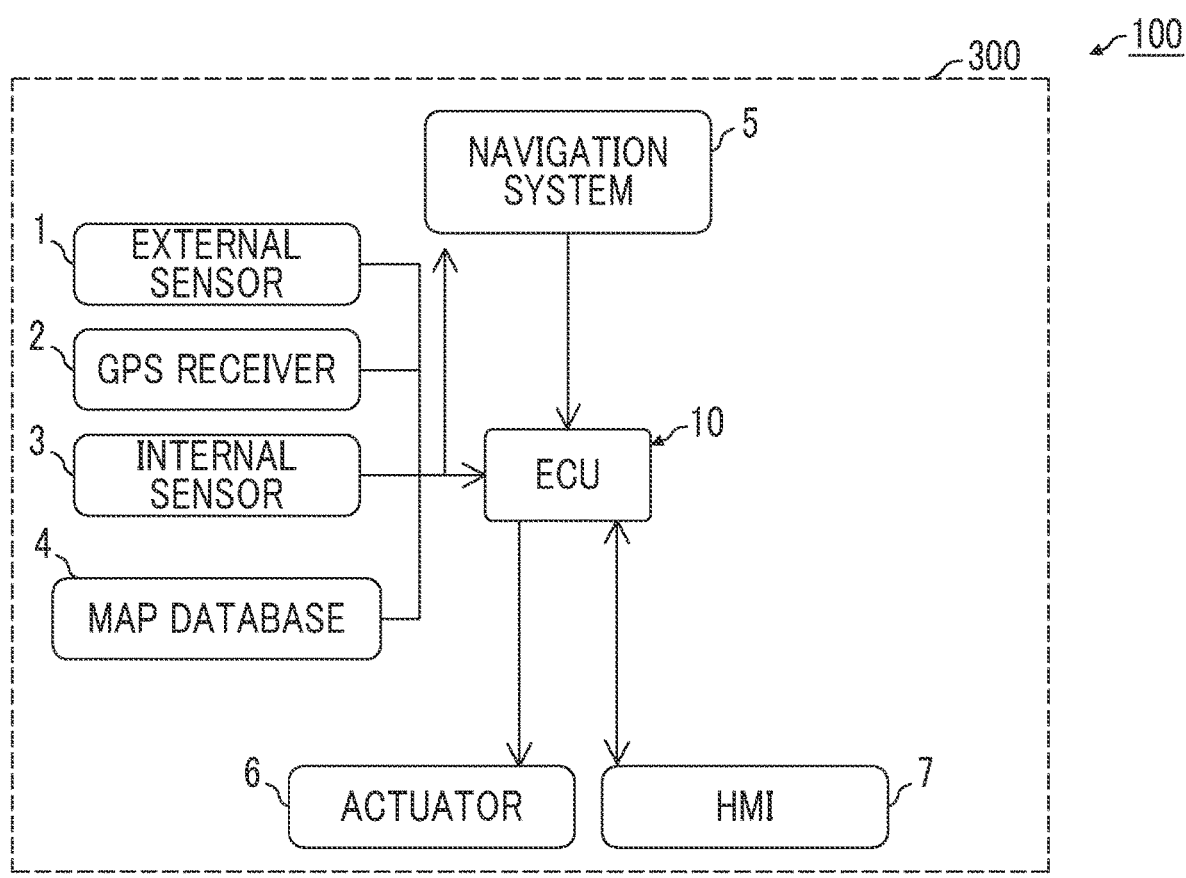
FIG. 1 is a block diagram illustrating a configuration of an assistance control system according to a first embodiment.

Hereinafter, embodiments of the present disclosure will be described in detail with reference to the drawings. In the following description, identical or similar elements are given the same reference numeral, and a repeated description will not be made. The present disclosure is applicable to general moving objects, but, in the following description, as a moving object, a vehicle, specifically, a vehicle that can perform autonomous driving will be described.

First Embodiment

FIG. 1 is a block diagram illustrating a configuration of an assistance control system 100 according to the first embodiment. In the following portion of the present specification, as illustrated in FIG. 1, a description will be made assuming that the entire assistance control system 100 is mounted on a vehicle 300 such as an automobile, but, as will be described later, there may be an aspect in which the whole or a part of the assistance control system 100 is provided in others than a vehicle, for example, a data center. The assistance control system 100 includes an external sensor 1, a global positioning system (GPS) receiver 2, an internal sensor 3, a map database 4, a navigation system 5, an actuator 6, a human machine interface (HMI) 7, and an ECU 10.

The external sensor 1 is a detector that detects external situations that are surrounding information of the vehicle 300. The external sensor 1 includes at least one of a camera, radio detecting and ranging (radar), and laser imaging detection and ranging (LIDAR). The camera is an imaging device that images external situations of the vehicle 300.

The camera is provided, for example, behind a windshield of the vehicle 300. The camera transmits imaging information regarding external situations of the vehicle 300 to the ECU 10. The camera may be a monocular camera, and may be a stereo camera.

The radar detects an external obstacle of the vehicle 300 by using an electric wave (for example, a millimeter wave). The radar transmits electric waves toward the periphery of the vehicle 300, and detects an obstacle by receiving electric waves reflected from the obstacle. The radar transmits information regarding the detected obstacle to the ECU 10.

The LIDAR detects an external obstacle of the vehicle 300 by using light. The LIDAR transmits light to the periphery of the vehicle 300, measures a distance to a reflection point by receiving light reflected from an obstacle, and detects the obstacle. The LIDAR transmits information regarding the detected obstacle to the ECU 10. All of the camera, the radar, and the LIDAR are not necessarily needed to be provided.

The GPS receiver 2 receives signals from three or more GPS satellites, and thus measures a position of the vehicle 300 (for example, latitude and longitude of the vehicle 300). The GPS receiver 2 transmits information regarding the measured position of the vehicle 300 to the ECU 10. Other means for specifying latitude and longitude of the vehicle 300 may be used instead of the GPS receiver 2. The function of the GPS receiver 2 measuring an azimuth of the vehicle 300 is preferably used to collate a measurement result in a sensor with map information which will be described later.

The internal sensor 3 is a detector that detects a traveling state of the vehicle 300. The internal sensor 3 includes at least one of a vehicle speed sensor, an acceleration sensor, and a yaw rate sensor. The vehicle speed sensor is a detector that detects a speed of the vehicle 300. As the vehicle speed sensor, for example, a wheel speed sensor that is provided on a wheel of the vehicle 300 or a drive shaft that is integrally rotated with the wheel, and detects a rotational speed of the wheel, is used. The vehicle speed sensor transmits information regarding the detected vehicle speed (wheel speed information) to the ECU 10.

The acceleration sensor is a detector that detects acceleration of the vehicle 300. The acceleration sensor includes, for example, a front-and-rear acceleration sensor that detects acceleration of the vehicle 300 in the front-rear direction thereof, and a lateral acceleration sensor that detects lateral acceleration of the vehicle 300. The acceleration sensor transmits, for example, acceleration information of the vehicle 300 to the ECU 10. The yaw rate sensor is a detector that detects a yaw rate (rotation angular velocity) about the vertical axis of the centroid of the vehicle 300. For example, a gyro sensor may be used as the yaw rate sensor. The yaw rate sensor transmits information regarding the detected yaw rate of the vehicle 300 to the ECU 10.

The map database 4 is a database including map information. The map database is provided in, for example, a hard disk drive (HDD) mounted on the vehicle. The map information includes, for example, position information of a road, information regarding a road shape (for example, a curve, the type of linear portion, and a curvature of a curve), and position information of each of an intersection and a crossroad. The map information preferably includes an output signal from the external sensor 1 in order to use position information of a shielding structure such as a building or a wall, or a simultaneous localization and mapping (SLAM) technique. The map database may be stored in a computer of a facility such as an information processing center that can perform communication with the vehicle 300, and this will be described later. The map database 4 may include legal speed limit information that is information regarding legal speed limits of a road on which a host vehicle is traveling and a road intersecting the road.

The navigation system 5 is a device that guides a driver of the vehicle 300 to a destination set by the driver of the vehicle 300.

The actuator 6 is a device that controls traveling of the vehicle 300. The actuator 6 includes at least a throttle actuator, a brake actuator, and a steering actuator. In a case where the vehicle 300 is a hybrid vehicle or an electric vehicle, the throttle actuator is not provided, and a control signal is input to a motor as a power source from the ECU 10 such that drive force thereof is controlled.

The brake actuator controls a brake system in response to a control signal from the ECU 10, and controls braking force applied to the wheels of the vehicle 300. Consequently, the steering actuator controls steering torque of the vehicle 300.

The HMI 7 is an interface used to output and input information between an occupant (including the driver) of the vehicle 300 and the assistance control system 100. The HMI 7 includes, for example, a display panel on which image information is displayed to occupants, a speaker outputting sounds, and operation buttons or a touch panel used for the occupants to perform input operations thereon.

Figure 2:
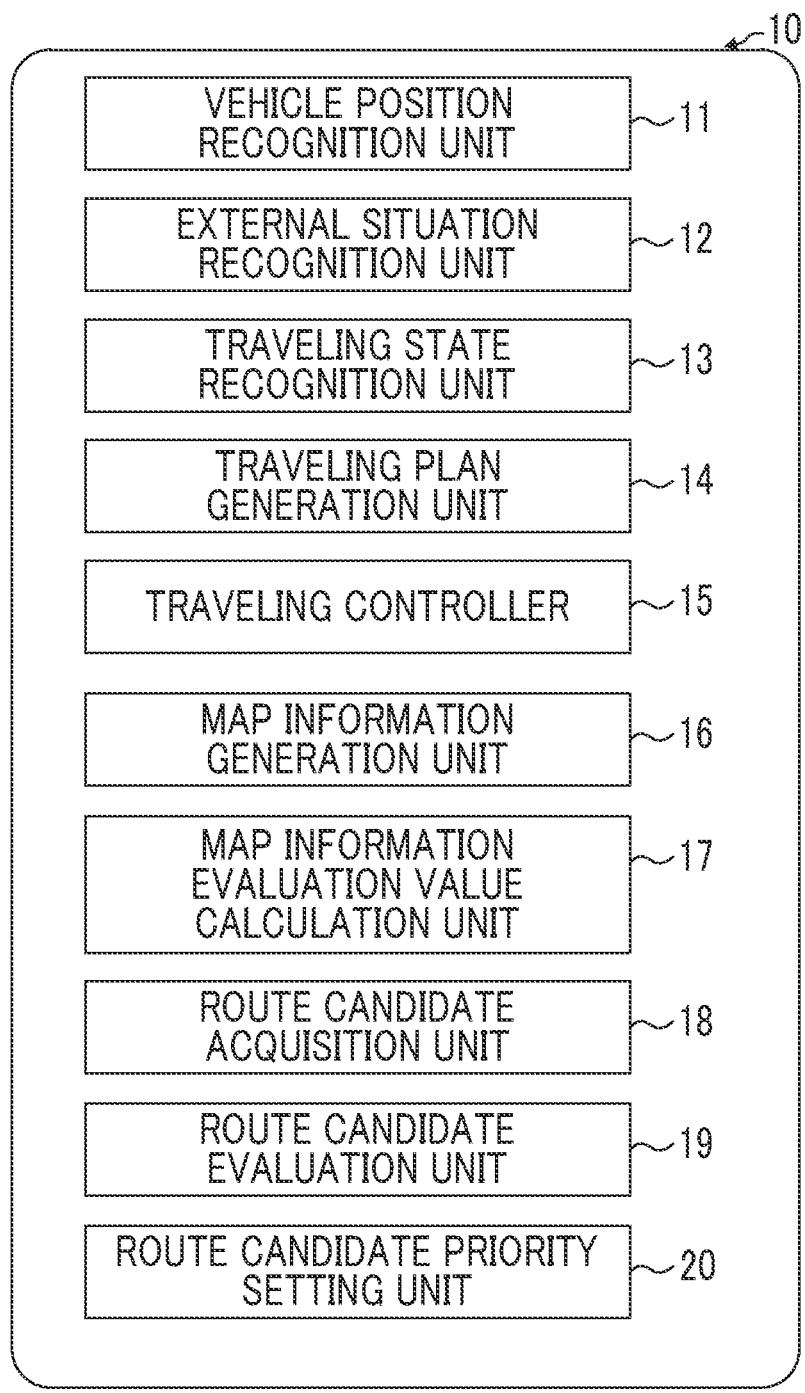
FIG. 2 is a block diagram illustrating a configuration of an electronic control unit (ECU) of the assistance control system according to the first embodiment.

The ECU 10 controls autonomous traveling of the vehicle 300. FIG. 2 illustrates functions of the ECU 10. The ECU 10 is an electronic control unit including a central processing unit (CPU), a read only memory (ROM), a random access memory (RAM), and the like. The ECU 10 loads a program stored in the ROM to the RAM, and performs various types of control by the CPU controlling the program. The ECU 10 may include a plurality of electronic control units.

The ECU 10 includes a vehicle position recognition unit 11, an external situation recognition unit 12, a traveling state recognition unit 13, a traveling plan generation unit 14, a traveling controller 15, a map information generation unit 16, a map information evaluation value calculation unit 17, a route candidate acquisition unit 18, a route candidate evaluation unit 19, and a route candidate priority setting unit 20.

The vehicle position recognition unit 11 recognizes a position (hereinafter, referred to as "vehicle position") of the vehicle 300 on a map based on position information of the vehicle 300 received by the GPS receiver 2 and map information in the map database 4. The vehicle position recognition unit 11 may acquire a vehicle position used by the navigation system 5 from the navigation system 5, so as to recognize the vehicle position. In a case where a vehicle position of the vehicle 300 can be measured by a sensor provided in the outside such as a road, the vehicle position recognition unit 11 may acquire a vehicle position from the sensor through communication.

The external situation recognition unit 12 recognizes external situations of the vehicle 300 based on a detection result (for example, imaging information from the camera, obstacle information from the radar, and obstacle information from the LIDAR) in the external sensor 1. The external situations include, for example, positions of white lines of a traveling lane or a position of the lane center with respect to the vehicle 300 and a road width, a shape of a road (for example, a curvature of a traveling lane, a road surface slope change effective for prospect estimation in the external sensor 1, and meandering), and situations of surrounding obstacles of the vehicle 300 (for example, information for differentiating a fixed obstacle from a moving obstacle, a position of an obstacle with respect to the vehicle 300, a movement direction of an obstacle with respect to the vehicle 300, and a relative speed of an obstacle with respect to the vehicle 300). Preferably, a detection result in the external sensor 1 is collated with the map information, and thus the accuracy of a position and a direction of the vehicle 300 acquired from the GPS receiver 2 or the like is supplemented.

The traveling state recognition unit 13 recognizes a traveling state of the vehicle 300 based on detection results in the internal sensor 3 (for example, vehicle speed information from the vehicle speed sensor, acceleration information from the acceleration sensor, and yaw rate information from the yaw rate sensor). A traveling state of the vehicle 300 includes, for example, a vehicle speed, acceleration, and a yaw rate.

The traveling plan generation unit 14 generates a course of the vehicle 300 based on, for example, a target route calculated by the navigation system 5, a vehicle position recognized by the vehicle position recognition unit 11, and external situations of the vehicle 300 (including a position and an azimuth of the vehicle) recognized by the external situation recognition unit 12. The course is a trajectory on which the vehicle 300 advances in the target route. The traveling plan generation unit 14 generates the course such that the vehicle 300 appropriately travels on the target route in light of safety, compliance with the law, traveling efficiency, and the like. In this case, needless to say, the traveling plan generation unit 14 generates the course of the vehicle 300 to avoid contact with an obstacle based on situations of surrounding obstacles of the vehicle 300. The target route mentioned here also includes a traveling route that is automatically generated based on external situations or the map information when a destination is not explicitly set by the driver.

The traveling plan generation unit 14 generates a traveling plan corresponding to the generated course. In other words, the traveling plan generation unit 14 generates a traveling plan according to the preset target route based on at least external situations corresponding to surrounding information of the vehicle 300 and the map information in the map database 4. The traveling plan may be data indicating changes in a vehicle speed, acceleration and deceleration, steering torque, and the like of the vehicle 300 when the vehicle 300 is traveling on the course along the target route. The traveling plan may include a speed pattern, an acceleration-and-deceleration pattern, and a steering pattern of the vehicle 300. The traveling plan generation unit 14 mentioned here may generate the traveling plan such that a trip time (a required time needed for the vehicle 300 to arrive at a destination) is smallest. The traveling plan includes a plan generated based on a traveling route set before traveling is started, and also includes a traveling plan generated based on dynamic factors during traveling, for example, detection results in the external situation recognition unit 12. A traveling plan generated in the past may be updated to a traveling plan generated based on dynamic factors during traveling.

The speed pattern is, for example, data including a target vehicle speed set in association with time for each target control position with respect to target control positions that are set at a predetermined interval (for example, 1 m) on a course. The acceleration-and-deceleration pattern is, for example, data including target acceleration and deceleration set in association with time for each target control position with respect to target control positions that are set at a predetermined interval (for example, 1 m) on a course. The steering pattern is, for example, data including target steering torque set in association with time for each target control position with respect to target control positions that are set at a predetermined interval (for example, 1 m) on a course.

The traveling controller 15 autonomously controls traveling of the vehicle 300 based on the traveling plan generated by the traveling plan generation unit 14. The traveling controller 15 outputs control signals corresponding to the traveling plan to the actuator 6. Consequently, the traveling controller 15 controls traveling of the vehicle 300 such that the vehicle 300 autonomously travels according to the traveling plan.

The map information generation unit 16 generates map information based on sensor input that is input from the external sensor 1, or updates the map information stored in the map database 4. Specifically, the map information is generated or updated by using, as the input, self-position estimation information, trajectory information, stationary object map information, and slope map information.

The map information evaluation value calculation unit 17 calculates a map information evaluation value for evaluating the map information generated or updated by the map information generation unit 16. The map information evaluation value is a value indicating the quality of the map information, in other words, the certainty. The map information evaluation value may be calculated at each location in a route candidate which will be described later, and may be calculated for each section with a predetermined length.

The map information evaluation value is preferably sequentially updated in accordance with a plurality of times of traveling of the vehicle 300 at an identical location or on an identical section. The map information evaluation value may be used in an aspect of permitting a predetermined driving assistance function, for example, in a case where the map information evaluation value in a predetermined section exceeds a threshold value set in advance in the predetermined section. An example of the predetermined driving assistance function may be a steering assistance function or an acceleration-and-deceleration assistance function. The predetermined driving assistance function may be permitted stepwise. A specific method of calculating the map information evaluation value differs depending on the type of input used by the map information generation unit 16, and thus details thereof will be described later.

The route candidate acquisition unit 18 acquires a plurality of route candidates from an autonomous driving start location to a destination set by the HMI 7. Specifically, the route candidates are acquired according to a known method by using the GPS receiver 2, the map database 4, and the navigation system 5.

The route candidate evaluation unit 19 evaluates the route candidates acquired by the route candidate acquisition unit 18 based on the map information evaluation value calculated by the map information evaluation value calculation unit 17. The route candidate evaluation unit 19 evaluates the accuracy of assistance control in the route candidates. The phrase "evaluating the accuracy of assistance control" indicates evaluating to what degree of accuracy predetermined assistance control can be performed in a case where the vehicle travels along a certain route candidate. An example thereof will be described below. Based on an evaluation result in the map information evaluation value calculation unit 17, in a route candidate, a section in which predetermined driving assistance control (which may be, for example, complete autonomous driving control in which a driver depends on a system in all functions, partial autonomous driving control in which the driver depends on the system in some of the functions, or driving assistance control in which the driver depends on the system in a steering operation or acceleration and deceleration operations) is not suitable to be performed is set as an unsuitable section, that is, a section in which data needed to reliably perform the predetermined driving assistance control is not acquired is set as the unsuitable section. Thereafter, the route candidate evaluation unit 19 calculates a distance of a section included in the unsuitable section, and evaluates a route candidate based on the distance.

As an example of a method of setting the unsuitable section, there may be an aspect in which, among map information evaluation values acquired and calculated at respective locations or respective sections between a current location and a destination, a set of locations or sections in which the map information evaluation values are equal to or smaller than a predetermined threshold value is set as the unsuitable section. As an aspect of evaluating a route candidate, the route candidate may be evaluated by using an average value of map information evaluation values at respective locations or respective sections in the route candidate, and may be evaluated by using the smallest map information evaluation value in the route candidate or the greatest map information evaluation value in the route candidate.

Figure 3:
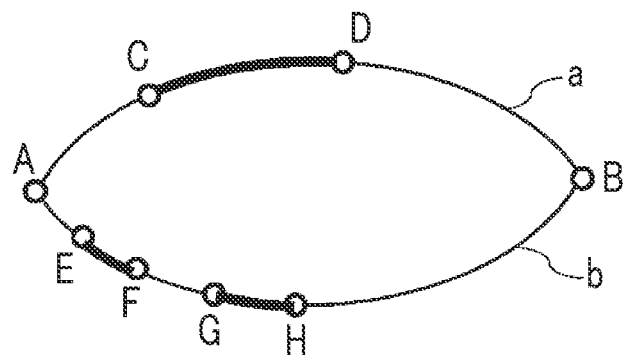
FIG. 3 is a diagram for describing an example of setting a route candidate priority and illustrating examples of route candidates including an unsuitable section.
Figure 4A:
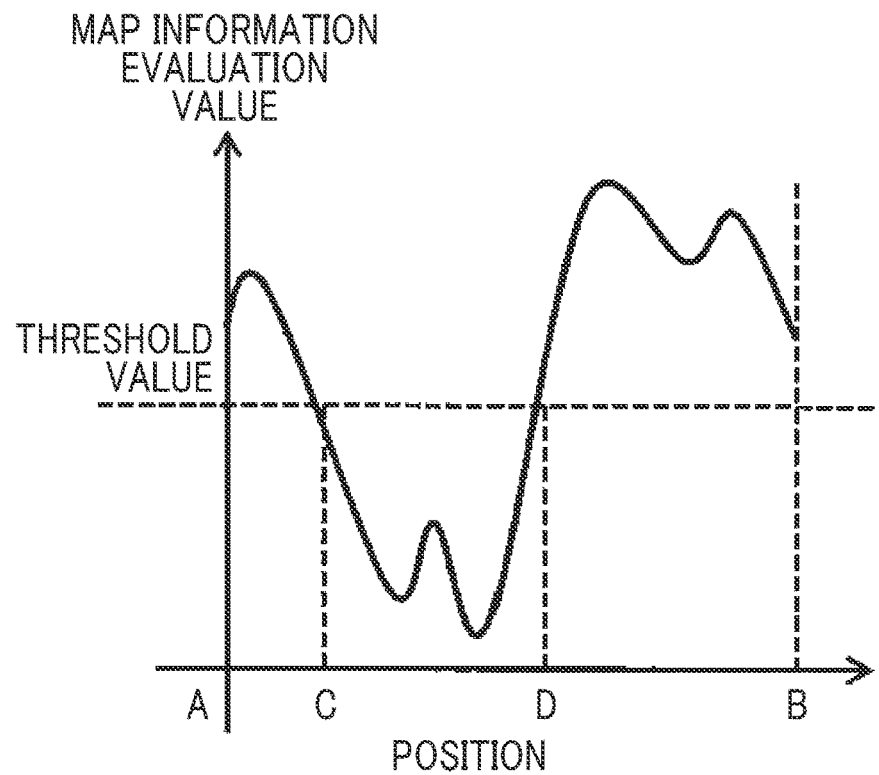
Figure 4B:
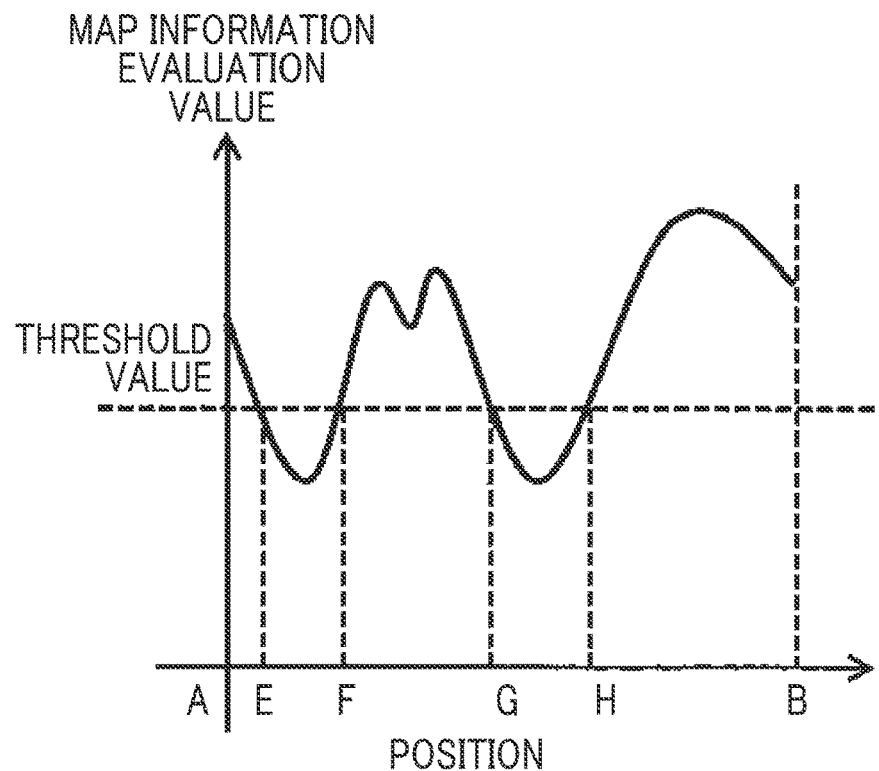
FIG. 4B is a graph illustrating an example of a map information evaluation value calculated for each route candidate, and illustrates an evaluation value of a route candidate b.

Hereinafter, the aspect will be described in detail. In the vehicle 300 present in a current location A, for example, a description will be made of a case where a location B is set as a destination by the HMI 7. The route candidate acquisition unit 18 acquires two route candidates such as a route candidate a and a route candidate b between the current location A and the location B (refer to FIG. 3). The map information evaluation value calculation unit 17 calculates a map information evaluation value at each location of each route candidate. Here, a map information evaluation value calculated in advance may be read from a database, and a map information evaluation value may be calculated at this timing. Herein, it is assumed that evaluation values for the route candidate a are calculated as illustrated in FIG. 4A, and evaluation values for the route candidate b are calculated as illustrated in FIG. 4B, between the current location A and the location B. In FIGS. 4A and 4B, a longitudinal axis expresses a map information evaluation value, and a transverse axis expresses a coordinate representing a position between the current location A and the location B.

In this case, a section in which the map information evaluation value is equal to or smaller than a preset predetermined threshold value in the route candidate, more specifically, a set of locations or sections may be set as an unsuitable section. In other words, a section between a location C and a location D is set as an unsuitable section in the route candidate a (FIG. 4A), and sections between a location E and a location F, and between a location G and a location H in the route candidate b (FIG. 4B) are set as an unsuitable section.

The route candidate evaluation unit 19 calculates a distance between the location C and the location D in the route candidate a, and sets the calculated distance as a distance of the unsuitable section in the route candidate a. In the route candidate b, a distance between the location E and the location F and a distance between the location G and the location H are calculated, and a sum thereof is set as a distance of the unsuitable section in the route candidate b.

The route candidate priority setting unit 20 assigns priorities to the route candidates acquired by the route candidate acquisition unit 18. Specifically, a priority of a route candidate for which an evaluation result in the route candidate evaluation unit 19 is lower is set to be higher than priorities of other route candidates. As an example, with respect to the respective route candidates acquired by the route candidate acquisition unit 18, unsuitable section distances in the route candidates calculated by the route candidate evaluation unit 19 may be compared with each other, a priority of a route candidate in which the unsuitable section distance is longer may be set to be high, and a priority of a route candidate in which the unsuitable section distance is shorter may be set to be low. Specifically, in the above example, in a case where the distance of the unsuitable section in the route candidate a and the distance of the unsuitable section in the route candidate b, calculated by the route candidate evaluation unit 19, are compared with each other, the distance of the unsuitable section in the route candidate a is longer, and thus a priority of the route candidate a is set to be higher than a priority of the route candidate b.

The priority of each route candidate set by the route candidate priority setting unit 20 is used as follows. In other words, among the route candidates acquired by the route candidate acquisition unit 18, the assistance control system 100 assists an occupant of a moving object such that the moving object travels along a route candidate having the highest priority. A specific aspect of the assistance includes an aspect in which the HMI 7 presents a route candidate having the highest priority to the occupant of the moving object, and also includes an aspect in which the traveling controller 15 performs autonomous traveling control along the route candidate having the highest priority.

According to the aspect, among a plurality of route candidates acquired in advance, a priority of a route candidate that is evaluated low can be set to be higher than priorities of other route candidates. In other words, a route candidate that is evaluated higher than other route candidates, that is, a route candidate in which the accuracy of the map information is high is not selected on purpose, and a route candidate that is evaluated lower than other route candidates, that is, a route candidate in which the accuracy of the map information is lower than those of other route candidates is selected. Therefore, a route candidate in which acquisition of map information is desirable by performing a larger number of times of movement than in other route candidates is more preferentially presented to an occupant than other route candidates, or a moving object more preferentially travels on the route candidate than on other route candidates, and thus this contributes to increasing the accuracy of map information.

According to the aspect, efficiency of increasing the accuracy of the entire map information is improved. Here, the "entire map information" indicates map information within a usage region of the vehicle 300 (for example, in a case where the vehicle is used with a specific location (home or office) as a base, within a peripheral region thereof (for example, within a predetermined distance from the specific location), and, in a case where the vehicle is used for movement among a plurality of bases, within a region including the respective bases). The phrase "increasing the accuracy of the entire map information" may include, for example, increasing the minimum value of a map information evaluation value in the entire map information. A difference between the minimum value and the maximum value of a map information evaluation value in the entire map information may be reduced. As the accuracy of the entire map information is greatly increased within a predetermined time or within a predetermined distance, efficiency of increasing the accuracy of the entire map information is improved.

Therefore, in a case where the vehicle travels on a route candidate in which the accuracy of map information is low, there is a high probability that the accuracy of the entire map information may be increased, and there is a high probability that the efficiency may be improved, compared with a case where the vehicle travels on a route candidate in which the accuracy of map information is high. This is because, in a case where the vehicle travels on a route candidate in which the accuracy of map information is high, for example, the minimum value of a map information evaluation value in the entire map information is hardly improved compared with a case where the vehicle travels on a route candidate in which the accuracy of map information is low. According to the aspect, a route candidate in which the accuracy of map information is low is selected on purpose, and the vehicle travels on the route candidate. Therefore, the accuracy of the map information in the route candidate in which the accuracy of the map information is low can be considerably improved, and thus the accuracy of the entire map information can be efficiently improved.

The efficiency is improved, and thus the accuracy of the entire map information is increased fast. In other words, it is possible to reduce a time needed for permission of the "predetermined driving assistance function", and thus to improve a driver's convenience. From the above description, according to the aspect, since the route candidate evaluation unit 19 calculates a route candidate evaluation value by using a distance of an unsuitable section in a route candidate, a route having a longer distance for which map information is not sufficiently acquired can be preferentially presented or the vehicle can be caused to travel on the route, and this contributes to more efficiently acquiring map information.

Figure 5:
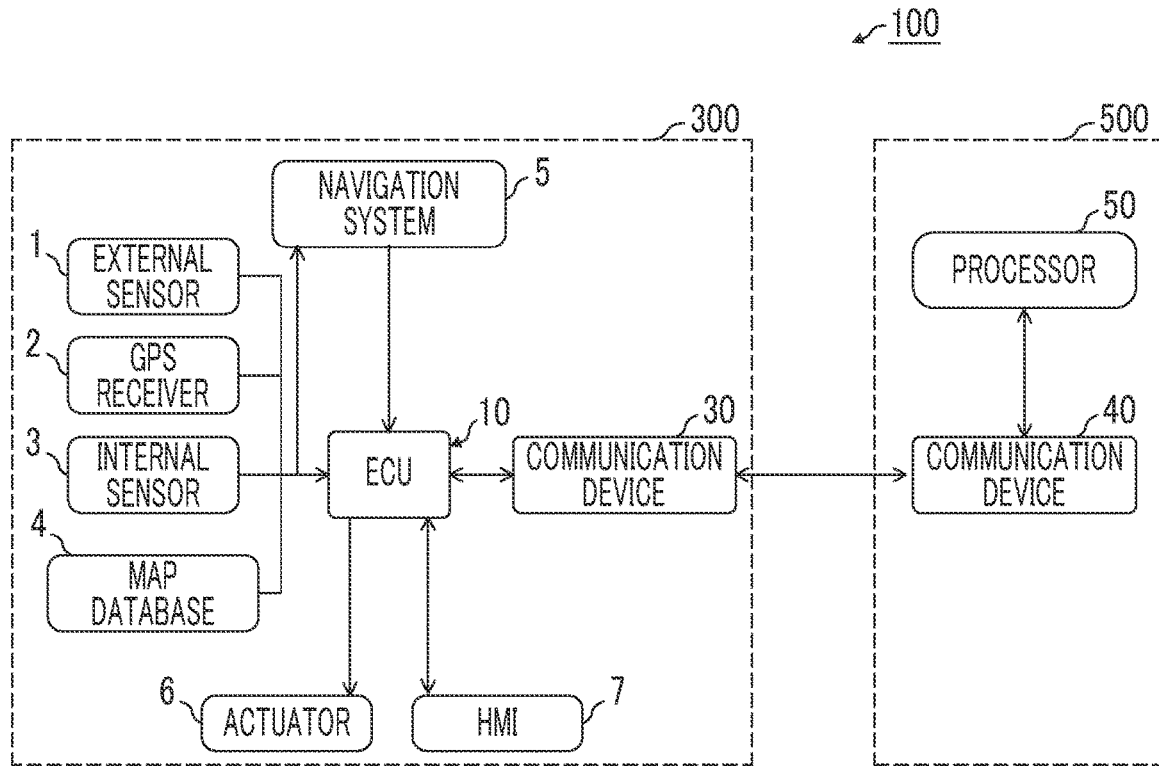
FIG. 5 is a block diagram illustrating another configuration of the assistance control system according to the first embodiment.

Here, a description will be made of a configuration of the assistance control system 100. As described above, the assistance control system 100 may be in an aspect in which the whole thereof is provided in the vehicle 300 as illustrated in FIG. 1, and may be in an aspect in which all or some of the functions thereof may be executed by an external data center 500 of the vehicle 300. Specifically, as illustrated in FIG. 5, there may be an aspect in which the ECU 10 is provided in the vehicle 300, a processor 50 is provided in the data center 500, and the processor 50 executes some of the functions of the ECU 10. In this case, in order to exchange information between the vehicle 300 and the data center 500, a communication device 30 is provided in the vehicle 300, and a communication device 40 is provided in the data center 500. In the example illustrated in FIG. 5, pieces of information from the external sensor 1, the GPS receiver 2, the internal sensor 3, the map database 4, the navigation system 5, and the HMI 7 of the vehicle 300 are transmitted to the communication device 30. The information is transmitted to the communication device 40 from the communication device 30, and is further transmitted to the processor 50 from the communication device 40. A processing result in the processor 50 is transmitted to the actuator 6 and the HMI 7 of the vehicle 300 via the communication device 40 and the communication device 30.

Figure 6:
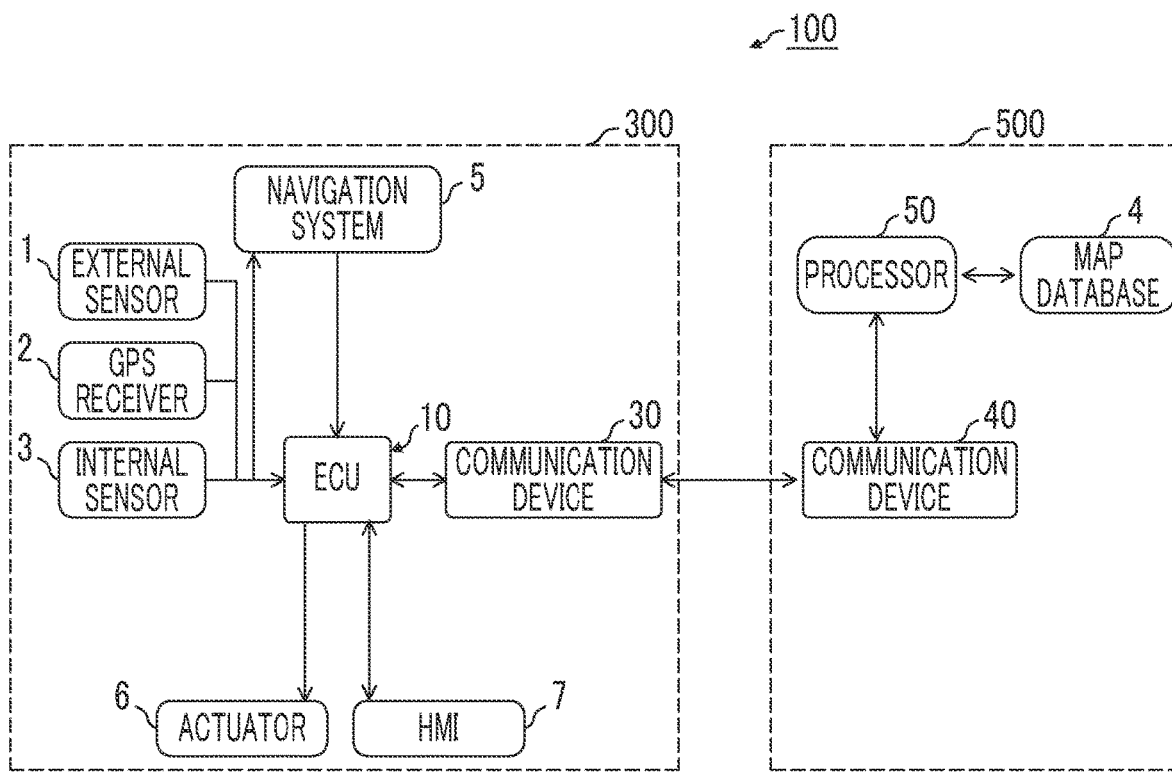
FIG. 6 is a block diagram illustrating still another configuration of the assistance control system according to the first embodiment.

As illustrated in FIG. 6, the map database 4 may be provided in the data center 500. Also in this case, in the same manner as in FIG. 5, pieces of information from the external sensor 1, the GPS receiver 2, the internal sensor 3, the navigation system 5, and the HMI 7 of the vehicle 300 are transmitted to the communication device 30. The information is transmitted to the communication device 40 from the communication device 30, and is further transmitted to the processor 50 from the communication device 40. A processing result in the processor 50 is transmitted to the map database 4 and the communication device 40. The information is transmitted to the actuator 6 and the HMI 7 of the vehicle 300 via the communication device 40 and the communication device 30. A case where each function of the ECU 10 is shared and executed by the vehicle 300 and the data center 500 is also included in the present embodiment.

Next, processes executed by the assistance control system 100 will be described in detail with reference to flowcharts of FIGS. 7 and 8.

FIGS. 7 and 8 are flowcharts illustrating processes in the assistance control system 100. In the assistance control system 100, the following flowcharts are executed by the ECU 10.

In FIG. 7, in step S1, a driver of the vehicle 300 sets a destination by using the HMI 7. In step S2, the route candidate acquisition unit 18 acquires a plurality of route candidates from a current location to the destination. In step S3, the route candidate priority setting unit 20 sets priorities of the route candidates based on outputs from the map information evaluation value calculation unit 17 and the route candidate evaluation unit 19. In step S4, assistance is given such that the vehicle 300 travels on a route candidate having the highest priority. Specifically, the HMI 7 may present the route candidate having the highest priority to an occupant, and the traveling controller 15 may control the moving object along the route candidate having the highest priority.

As an aspect of presenting the route candidate having the highest priority to the occupant, the HMI 7 may display a plurality of route candidates and priorities of the route candidates in association with each other, and the driver may select on which route candidate the vehicle is to travel based on the priorities. "Displaying the route candidates and the priorities of the route candidates in association with each other" may include an aspect in which a route candidate having a high priority is displayed to be emphasized more than a route candidate having a low priority. Specifically, a size of text indicating a route candidate having a high priority may be larger than a size of text indicating a route candidate having a low priority. A color (noticeable color) indicating a route candidate having a high priority may be displayed to be greater in saturation than a color indicating a route candidate having a low priority. A route candidate having a high priority may be displayed to be higher in luminance than a route candidate having a low priority.

An example of route candidate priority setting in step S3 is performed according to the flowchart of FIG. 8. In FIG. 8, in step S31, the route candidate evaluation unit 19 sets, as an unsuitable section, a section not suitable for autonomous driving in a route candidate based on map information evaluation values calculated by the map information evaluation value calculation unit 17. Next, in step S32, the route candidate evaluation unit 19 calculates a distance of a section included in the unsuitable section. In step S33, the route candidate priority setting unit 20 compares unsuitable section distances in the route candidates calculated by the route candidate evaluation unit 19 with each other for the respective route candidates, sets a priority of a route candidate in which the unsuitable section distance is longer to be high, and sets a priority of a route candidate in which the unsuitable section distance is shorter to be low.

Aspects of the route candidate evaluation unit 19 and the route candidate priority setting unit 20 described above are merely examples, and other aspects may be employed. For example, in the above example, the route candidate priority setting unit 20 decides a priority based on a distance of an unsuitable section calculated by the route candidate evaluation unit 19, but may decide a priority based on a weighted distance of an unsuitable section. Here, weighting may be set from the viewpoint of whether data needed to reliably perform predetermined driving assistance is easily collected in a section set as an unsuitable section in a route candidate. For example, when a case where an intersection is included in a section set as an unsuitable section is compared with a case where an intersection is not included therein, it is not easy to collect data needed to reliably perform predetermined driving assistance in the case where an intersection is included. In other words, a plurality of times of traveling is necessary in order to collect the data. Conversely, it is easier to collect data needed to reliably perform predetermined driving assistance in the case where an intersection is not included than in the case where an intersection is included. In other words, the data can be sufficiently collected through a smaller number of times of traveling. In this case, a greater weight is applied in the case where an intersection is included in a section set as an unsuitable section than in the case where an intersection is not included therein. In other words, a weighted distance of an unsuitable section is regarded to be longer than an actual distance, and thus a high priority is easily set to a route candidate including the unsuitable section. With this configuration, it is possible to efficiently improve the accuracy of the entire map information.

Figure 9A:
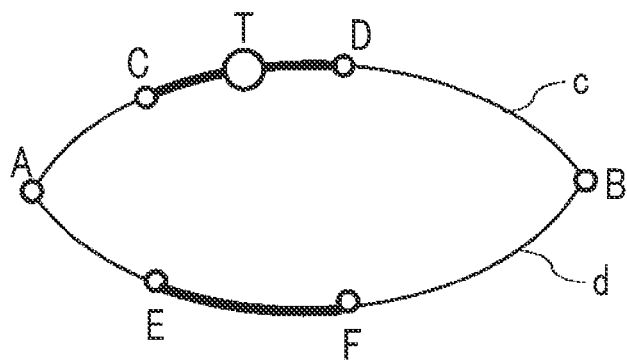
FIG. 9A is a diagram for describing an example of setting a route candidate priority and illustrating examples of route candidates including an unsuitable section.

Hereinafter, a detailed description will be made with reference to FIG. 9A. Regarding a route candidate c and a route candidate d that are route candidates acquired by the route candidate acquisition unit 18, it is assumed that the route candidate evaluation unit 19 sets a section between a location C and a location D as an unsuitable section in the route candidate c, and sets a section between a location E and a location F as an unsuitable section in the route candidate d. It is assumed that a distance between the location C and the location D is the same as a distance between the location E and the location F. It is also assumed that information indicating that an intersection T is present between the location C and the location D and an intersection is not present between the location E and the location F is obtained from the map database 4. Here, weighted distances of the unsuitable sections are compared with each other according to the method. Since the section in which the intersection is present between the location C and the location D is weighted greater than the section in which an intersection is not present between the location E and the location F, when the weighted distances of the unsuitable sections are compared with each other, the distance in the route candidate c is longer than that in the route candidate d, and thus a priority of the route candidate c is set to be higher than a priority of the route candidate d.

In another method, the route candidate priority setting unit 20 may decide a priority according to a proportion of a distance of an unsuitable section calculated by the route candidate evaluation unit 19 to a distance of the entire route candidate.

Figure 9B:
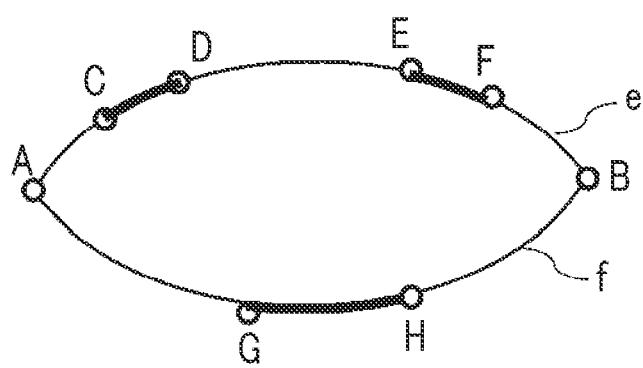
FIG. 9B is a diagram for describing an example of setting a route candidate priority and illustrating examples of route candidates including an unsuitable section.

The route candidate priority setting unit 20 may set a priority according to the number of unsuitable sections in a route candidate, set by the route candidate evaluation unit 19. Hereinafter, a detailed description will be made with reference to FIG. 9B. Regarding a route candidate e and a route candidate f acquired by the route candidate acquisition unit 18, it is assumed that the route candidate evaluation unit 19 sets a section between a location C and a location D and a section between a location E and a location F as unsuitable sections in the route candidate e, and sets a section between a location G and a location H as an unsuitable section in the route candidate f. In this case, of the route candidate e in which two unsuitable sections are present and the route candidate f in which a single unsuitable section is present, the route candidate priority setting unit 20 sets a priority of the route candidate e in which the number of unsuitable sections is larger to be higher.

Figure 9C:
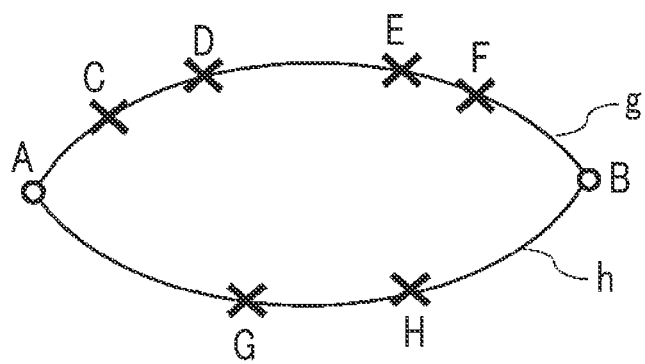
FIG. 9C is a diagram for describing an example of setting a route candidate priority and illustrating examples of route candidates including an unsuitable section.

There may be an aspect in which the map information evaluation value calculation unit 17 calculates map information evaluation values at predetermined intervals, sets a location (hereinafter, referred to as an "unsuitable location") for which a map information evaluation value is equal to or smaller than a predetermined threshold value, and compares respective route candidates with each other in terms of the number of unsuitable locations in each of the route candidates. Hereinafter, a detailed description will be made with reference to FIG. 9C. Regarding a route candidate g and a route candidate h acquired by the route candidate acquisition unit 18, it is assumed that the number of unsuitable locations is four in the route candidate g, and is two in the route candidate h. In this case, the route candidate priority setting unit 20 sets a priority of the route candidate g in which the number of unsuitable locations is larger to be higher. Also in this aspect, a route candidate having a longer distance for which map information is not sufficiently acquired can be preferentially presented to the occupant, or the vehicle can be controlled along the route candidate, and thus efficiency of increasing the accuracy of the entire map information is improved.

Second Embodiment

Next, a second embodiment will be described. In the present embodiment, the vehicle 300 is caused to travel along a route candidate having the highest priority set by the route candidate priority setting unit 20. In a description of the present embodiment, differences from the first embodiment will be focused.

Figure 10:
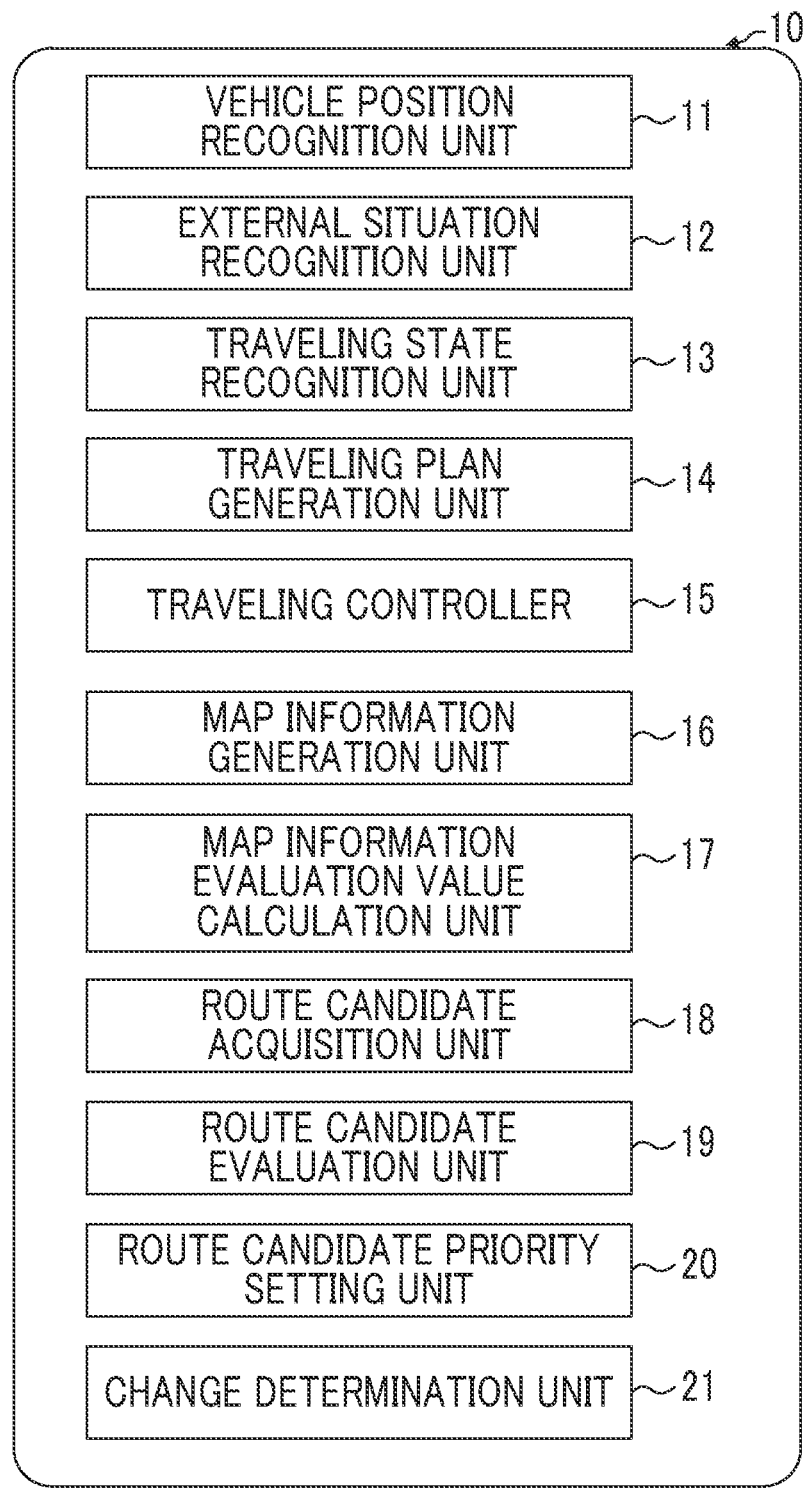
FIG. 10 is a block diagram illustrating a configuration of an ECU of an assistance control system according to a second embodiment.

FIG. 10 is a block diagram illustrating the ECU 10 of the assistance control system 100 according to the second embodiment. As illustrated in FIG. 10, the assistance control system 100 of the present embodiment is different from that of the first embodiment in that a change determination unit 21 is provided. The rest are the same as those in FIG. 2 of the first embodiment. In the same manner as in the first embodiment, the aspects in FIGS. 5 and 6 may be employed.

The vehicle 300 travels a plurality of times on a route candidate having the highest priority set by the route candidate priority setting unit 20, the map information generation unit 16 updates map information according thereto, the map information evaluation value calculation unit 17 updates a map information evaluation value, and then the change determination unit 21 determines a difference (change amount) between map information evaluation values before and after traveling.

Specifically, a detailed description will be made. First, the change determination unit 21 determines whether the number of times of traveling according to the traveling plan is a predetermined number of times based on a priority set by the route candidate priority setting unit 20. In a case where the vehicle 300 is traveling on a route candidate employed in the traveling plan, the map information generation unit 16 updates the map information in response to new input from the external sensor 1, and the map information evaluation value calculation unit 17 updates the map information evaluation value. The change determination unit 21 calculates a change amount between the map information evaluation value before the traveling and the map information evaluation value after the traveling.

The change determination unit 21 determines whether the change amount between the map information evaluation values satisfies a predetermined condition. Specifically, in a case where the number of times of traveling of the vehicle 300 in the traveling plan is equal to or larger than a predetermined number of times, the change determination unit 21 determines whether the change amount between the map information evaluation values is equal to or less than a predetermined threshold value (hereinafter, referred to as a "first threshold value"). Thereafter, in a case where the change determination unit 21 determines that the change amount between the map information evaluation values is equal to or less than the first threshold value, the route candidate priority setting unit 20 reduces the priority of the route candidate on which the vehicle has travelled.

With the aspect, in a case where a map information evaluation value is not improved despite map information being updated by causing the vehicle to travel on a route candidate having the highest calculated priority, the route candidate may be changed to a route candidate in which a map information evaluation value is more easily improved, and the vehicle 300 may be guided to the route candidate. Therefore, efficiency of increasing the accuracy of the entire map information is improved.

Figure 11:
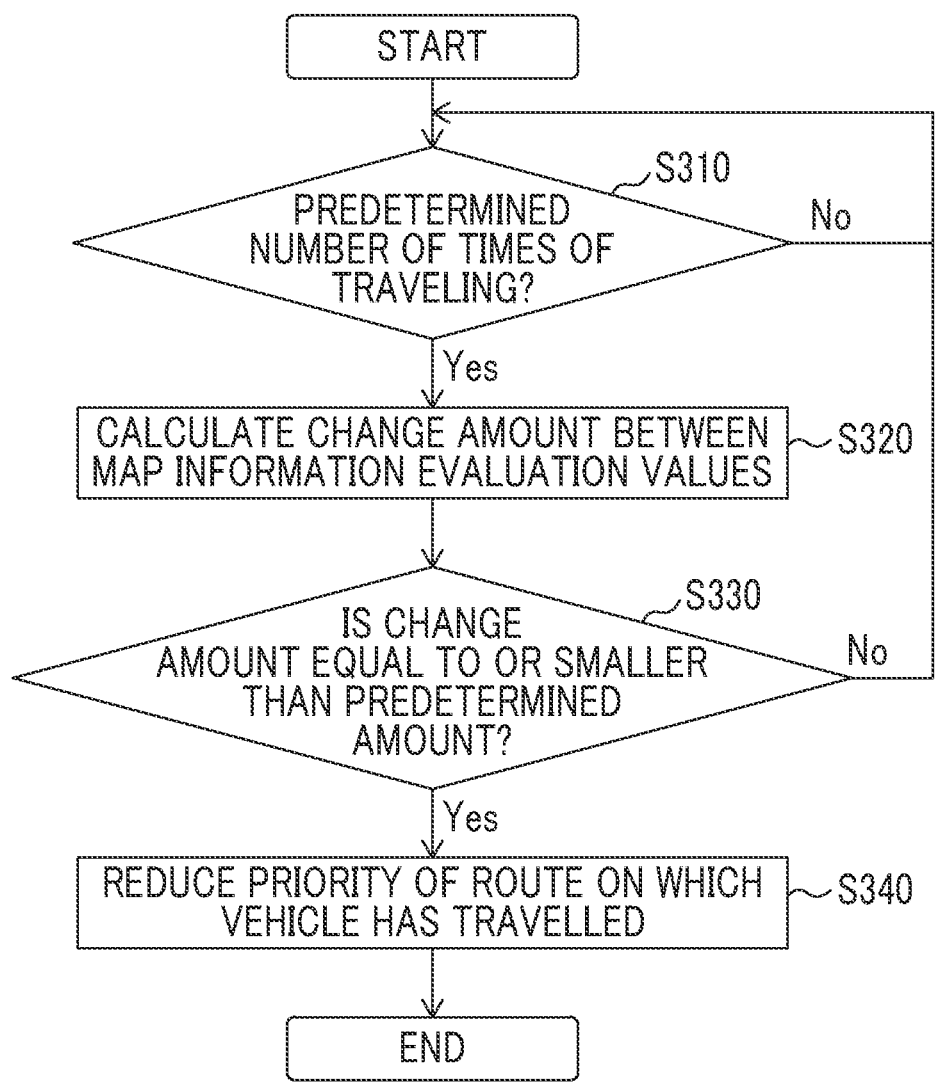
FIG. 11 is a flowchart illustrating a process performed by the assistance control system according to the second embodiment.

FIG. 11 is a flowchart illustrating processes executed by the assistance control system 100 in detail. As described above, in the present embodiment, the traveling plan generation unit 14 employs a route candidate having the highest priority set by the route candidate priority setting unit 20 in a traveling plan, and the traveling controller 15 causes the vehicle 300 to travel according to the traveling plan. The flowchart of FIG. 11 is started when the vehicle is traveling or after the vehicle travels along a predetermined section.

In step S310, the change determination unit 21 determines whether the number of times of traveling of the vehicle 300 in the traveling plan is a predetermined number of times based on a priority set by the route candidate priority setting unit 20. In a case where the change determination unit 21 determines that the number of times of traveling is smaller than the predetermined number of times, step S310 is repeatedly executed. In a case where the change determination unit 21 determines that the number of times of traveling is equal to or larger than the predetermined number of times, the flow proceeds to step S320. In step S320, the change determination unit 21 calculates a change amount between map information evaluation values updated by the map information evaluation value calculation unit 17 before and after the predetermined number of times of traveling is performed.

In step S330, the change determination unit 21 determines whether the change amount between the map information evaluation values is equal to or smaller than a predetermined amount. In a case where the change determination unit 21 determines that the change amount is larger than the predetermined amount, that is, determines that the map information evaluation value is appropriately increased through the predetermined number of times of traveling, the flow returns to step S310. In a case where the change determination unit 21 determines that the change amount is equal to or smaller than the predetermined amount, that is, determines that the map information evaluation value is not appropriately increased despite the predetermined number of times of traveling, the flow proceeds to step S340.

Next, in step S340, the route candidate priority setting unit 20 performs a process of reducing the priority of the route candidate on which the vehicle has travelled. In other words, in a case where there is a plurality of route candidates, a process of relatively increasing a priority of a route candidate not employed in the traveling plan is performed.

A predetermined condition used by the change determination unit 21 is not limited to the above-described condition, and the change determination unit 21 may determine whether a change amount of a map information evaluation value is equal to or more than a predetermined threshold value (hereinafter, referred to as a "second threshold value").

In a case where the change determination unit 21 determines that the change amount of the map information evaluation value is equal to or more than the second threshold value, the route candidate priority setting unit 20 reduces the priority of the route candidate on which the vehicle has travelled. Here, the second threshold value is preferably greater than the first threshold value. It is preferable to use a variable value that increases as the number of times which the vehicle 300 has travelled via a predetermined traveling location or on a predetermined traveling section in a route candidate increases. In a case where the change amount of the map information evaluation value is determined as being equal to or more than the second threshold value, it can be said that the map information evaluation value sharply increases relative to the number of times of traveling. From the viewpoint of increasing the accuracy of the entire map information, in the above case, map information is preferably acquired by traveling on another route candidate. Therefore, in the above case, another route candidate can be presented to an occupant or the vehicle can be controlled along the route candidate by reducing a priority of a route candidate (a route candidate having the highest priority) on which the vehicle has travelled. Therefore, efficiency of increasing the accuracy of the entire map information is improved.

As mentioned above, according to the second embodiment, a priority of a route candidate on which a vehicle has travelled is reduced based on a change amount of a map information evaluation value due to update of map information, and thus it is possible to determine whether another route candidate is presented to an occupant or the vehicle is controlled along the route candidate. Therefore, it is possible to contribute to improving efficiency of increasing the accuracy of the entire map information.

As mentioned above, the embodiments of the present disclosure have been described, but the present disclosure may be implemented in various aspects without being limited to the embodiments.

In the above description, the description has been made focusing on a vehicle that can perform autonomous driving as a moving object, but the present disclosure is not limited thereto. For example, the present disclosure is applicable to a moving object in which map information in a predetermined region that is set in advance is needed to be quickly created, such as a self-propelled robot cleaner that travels and works on a floor surface.

In the above description, a description has been made of a process of creating map information by using sensor input acquired by the vehicle 300, but the map information may be created by also using sensor input from vehicles other than the vehicle 300. The map information may be shared with one or a plurality of other vehicles via the data center by using a well-known communication device.

Regarding Map Information

Here, although not described in the above description, details of map information and a map information evaluation value used by the map information generation unit 16 and the map information evaluation value calculation unit 17 are will be described below. The map information includes not only general road maps or navigation maps but also map information in various viewpoints. The map information described below includes stationary object map information, characteristic object map information, and terrain map information. Each piece of the map information has information associated with a position (absolute position). Hereinafter, various types of map information will be described in detail.

FIG. 12 is a conceptual diagram for describing stationary object map information. The stationary object map information is map information regarding a stationary object, and indicates whether a stationary object is present for each position. Examples of stationary objects may include immobile road structures such as walls or guardrails. The external sensor 1, particularly, the LIDAR is used to detect a stationary object. The LIDAR sequentially outputs (performs scanning with) laser beams in a plurality of directions.

A peripheral space of a vehicle is divided into a plurality of voxels V. In a case where at least one laser beam is reflected at a certain voxel $V_i$, a measurement result value $M_i$ regarding the voxel $V_i$ is set to "1". In a case where all laser beams incident to the voxel $V_i$ pass therethrough without being reflected, the measurement result value $M_i$ regarding the voxel $V_i$ is set to "0". The measurement result value $M_i$="1" indicates that a certain object is present in the voxel $V_i$. On the other hand, the measurement result value $M_i$="0" indicates that no object is present in the voxel $V_i$.

The LIDAR temporally repeatedly performs scanning with laser beams. Therefore, a plurality of temporally consecutive measurement result values $M_i$ is obtained with respect to the identical voxel $V_i$. An "occupancy $R_i$" regarding the voxel $V_i$ is defined by an average value of the measurement result values $M_i$ (a value obtained by dividing the sum total of the measurement result values $M_i$ by the number N of times of measurement). When the vehicle 300 is passing an identical road, a new measurement result value $M_i$ regarding the voxel $V_i$ is obtained, and thus the occupancy $R_i$ is calculated again. In other words, the occupancy $R_i$ is updated.

The occupancy $R_i$="1" indicates that an object is present in the voxel $V_i$ "at all times". There is a high probability that an object that is present at all times may be a stationary object. In other words, the occupancy $R_1$="1" indicates that there is a high probability that a stationary object may be present in the voxel $V_i$. In contrast, the occupancy $R_i$="0" indicates that there is a high probability that a stationary object may not be present in the voxel $V_i$. In a case where the occupancy $R_i$ is around 0.5, this indicates that it is not clear whether an object is present in the voxel $V_i$.

The information indicating that "there is a high probability of a stationary object being present" is useful. For example, such information is used to remove a stationary object from a LIDAR point group and thus to detect a mobile object such as a pedestrian. The information indicating that "there is a high probability of a stationary object not being present" is also useful. This is because, in a case where an object is detected in a free space in which there is no stationary object, the detected object can be regarded as a mobile object. As mentioned above, the stationary object map information may be used to detect a mobile object.

FIG. 12 illustrates an example of a data structure of stationary object map information. A single data set is created for each voxel $V_i$. In the example illustrated in FIG. 12, the data set includes a position [X,Y,Z], the occupancy $R_i$, stationary object map evaluation information, and a stationary object map information evaluation value of the voxel $V_i$.

The map information evaluation value calculation unit 17 calculates a stationary object map information evaluation value indicating the certainty of the stationary object map information. In other words, the stationary object map information evaluation value indicates the certainty of a stationary object being present at the position [X,Y,Z] included in the stationary object map information. The certainty may be replaced with accuracy or reliability. The stationary object map information evaluation value may be replaced with a score.

The stationary object map evaluation information is information used to calculate a stationary object map information evaluation value. The evaluation information includes the number N of times of measurement. When the number N of times of measurement is small, the stationary object map information evaluation value is small, and, as the number N of times of measurement becomes larger, the stationary object map information evaluation value becomes greater. The stationary object map evaluation information may include a variance of positions of measurement points (reflection points) included in the voxel $V_i$. As the variance increases, the stationary object map information evaluation value decreases.

The map information generation unit 16 generates and updates the stationary object map information. The map information generation unit 16 generates or updates a data set regarding each voxel $V_i$ based on a position and an azimuth of the vehicle 300.

FIG. 13 is a conceptual diagram for describing characteristic object map information. The characteristic object map information is map information regarding a characteristic object, and indicates a position of the characteristic object. Examples of characteristic objects are a white line, a signboard (areal object), and a pole (columnar object). For example, the characteristic object map information is used for a localizing process for increasing the accuracy of position information of the vehicle 300. Hereinafter, as an example, characteristic object map information regarding a white line WL will be described. This is also the same for other characteristic objects.

A position of the white line WL is indicated by positions [Xs,Ys,Zs] and [Xe,Ye,Ze] of both ends of the white line WL. For example, the external sensor 1, particularly, the LIDAR and the camera are used to calculate a position of the white line WL. Specifically, a road surface image representing a road surface is generated based on camera imaging information or LIDAR measurement information. Next, the white line WL is extracted from the road surface image through a binarization process or an edge detection process. A position of the white line WL is calculated based on the camera imaging information or the LIDAR measurement information.

When the vehicle 300 is passing an identical road, similar white lines WL are repeatedly measured (detected), and positions of the similar white lines WL are repeatedly calculated. In this case, an average value or a weighted average value of positions calculated hitherto is used as a position. In other words, whenever the similar white lines WL are measured, positions thereof are updated. In a case of the weighted average value, for example, the greatest weight is set for the latest position. Whether the white line WL measured this time is the same as the existing white line WL is determined depending on whether the white line WL measured this time is included in a peripheral predetermined range of the existing white line WL.

FIG. 13 illustrates an example of a data structure of the characteristic object map information. A single data set is created for each white line WL. In the example illustrated in FIG. 13, the data set includes a position, characteristic object map evaluation information, and a characteristic object map information evaluation value of the white line WL.

The characteristic object map information evaluation value indicates "certainty" of the characteristic object map information. In other words, the characteristic object map information evaluation value indicates the certainty of a characteristic object being present at the position included in the characteristic object map information.

The characteristic object map evaluation information is information used to calculate a characteristic object map information evaluation value. The characteristic object map evaluation information includes the number of times of measurement, a variance of calculated positions, and the like. For example, when the number of times of measurement is small, the characteristic object map information evaluation value is small, and, as the number of times of measurement becomes larger, the characteristic object map information evaluation value becomes greater. As the variance of calculated positions increases, the characteristic object map information evaluation value decreases.

The map information generation unit 16 generates and updates the characteristic object map information. Particularly, a data set regarding each white line WL (characteristic object) is generated or updated.

FIG. 14 is a conceptual diagram for describing terrain map information. The terrain map information is map information regarding terrain, and indicates a height (altitude) Z of a road surface at a position [X,Y]. The terrain map information is used as follows. For example, an obstacle (for example, a fallen object) on a road surface may be detected by removing the road surface from a LIDAR point group. As another example, a road surface slope may be calculated based on information indicating the height Z, and vehicle traveling control such as acceleration and deceleration may be planned based on the road surface slope. As still another example, a traveling region in which the vehicle 300 can travel may be determined.

For example, the external sensor 1, particularly, the LIDAR is used to calculate the height Z of a road surface at the position [X,Y]. Specifically, a road surface point group representing the road surface is extracted from a LIDAR point group. A road surface point group included in a predetermined range of the vicinity of the position [X,Y] is extracted. The height Z of the road surface at the position [X,Y] is calculated by interpolating heights $ZL_j$ of respective extracted road surface point groups. For example, an average value of the heights $ZL_j$ of the respective extracted road surface point groups is calculated the height Z. The number of road surface points and a variance of the respective heights $ZL_j$ used to calculate the height Z may be used as terrain map evaluation information which will be described later.

When the vehicle 300 is passing an identical road, similar road surfaces are repeatedly measured (detected), and heights Z of the similar road surfaces are repeatedly calculated. In this case, an average value or a weighted average value of the heights Z calculated hitherto is used as the height Z. In other words, whenever the similar road surfaces are measured, the heights Z thereof are updated. In a case of the weighted average value, for example, the greatest weight is set for the latest height Z.

FIG. 14 illustrates an example of a data structure of the terrain map information. A single data set is created for each position [X,Y]. In the example illustrated in FIG. 14, the data set includes each position [X,Y], the height Z, terrain map evaluation information, and terrain map information evaluation value.

The terrain map information evaluation value indicates "certainty" of the terrain map information. In other words, the terrain map information evaluation value indicates the certainty of a road surface being present at the position [X,Y] and the height Z included in the terrain map information.

The terrain map evaluation information is information used to calculate a terrain map information evaluation value. The terrain map evaluation information includes the number of times of measurement, a variance, and the like. The number of times of measurement includes at least one of the number of times of calculation of the height Z and the number of road surface points used to calculate the heights Z. The variance includes at least one of a variance of the calculated heights Z and a variance of the respective heights $ZL_j$ of road surface points used to calculate the heights Z. For example, when the number of times of measurement is small, the terrain map information evaluation value is small, and, as the number of times of measurement becomes larger, the terrain map information evaluation value becomes greater. As the variance of calculated positions increases, the terrain map information evaluation value decreases. As another example, as a difference between the height Z and a height Z' at an adjacent position becomes greater, an evaluation value may become smaller.

The map information generation unit 16 generates and updates the terrain map information. Specifically, a data set regarding each position [X,Y] is generated or updated.

What is claimed is:

1. An assistance control system, which includes a map database storing map information, that performs assistance control for causing a moving object to move to a destination based on the map information stored in the map database, wherein the assistance control includes at least one of steering control or acceleration and deceleration control, the assistance control system comprising:
an electronic control unit programmed to:
generate or update the map information based on input from a sensor mounted on the moving object,
acquire a plurality of route candidates to the destination,
evaluate the route candidates based on a distance of a section included in an unsuitable section of the route candidates, wherein the unsuitable section is the section where the assistance control that includes the at least one of steering control or acceleration and deceleration control based on the map information cannot be performed,
set a priority of a route candidate, which is evaluated lower among the route candidates based on the distance of the section included in the unsuitable section, to be higher than priorities of other route candidates, and
present a route candidate having the highest priority among the route candidates to an occupant of the moving object, or control the moving object along the route candidate having the highest priority.

2. The assistance control system according to claim 1, wherein the electronic control unit is programmed to set the priority of a route candidate having the longer unsuitable section distance to be higher in priority compared with the priority of a route candidate having the shorter unsuitable section distance among the route candidates.

3. The assistance control system according to claim 1, wherein the electronic control unit is programmed to set the priority of a route candidate based on a weighted distance of the unsuitable section.

4. The assistance control system according to claim 3, wherein the electronic control unit is programmed to weight the distance more greatly in a case where data needed to reliably perform predetermined driving assistance is less easily collected in the section set as the unsuitable section in the route candidate compared to a case where data needed to reliably perform predetermined driving assistance is more easily collected.

* * * * *